Figure 4:
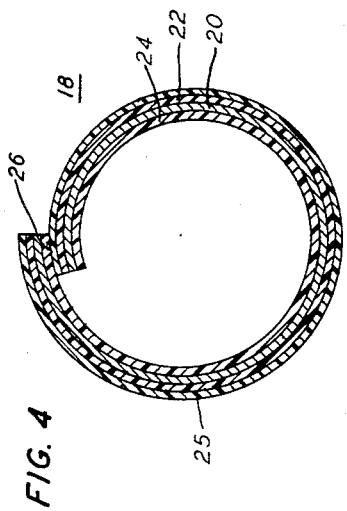

Oct. 29, 1968 W. C. KLEINFELDER 3,408,450
CABLE TERMINATION
Filed Aug. 4, 1966 3 Sheets-Sheet 1
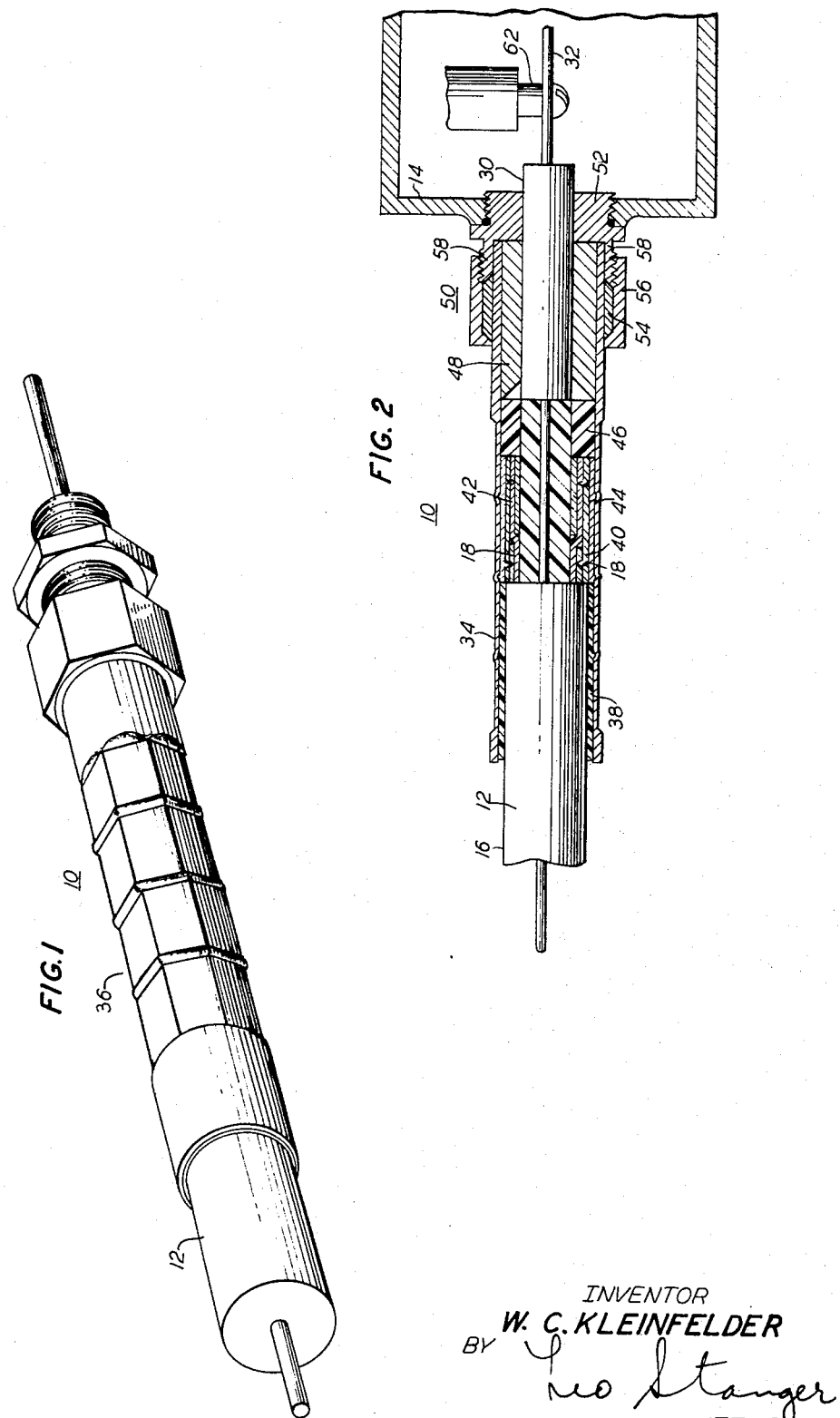
INVENTOR
W. C. KLEINFELDER
BY
ATTORNEY

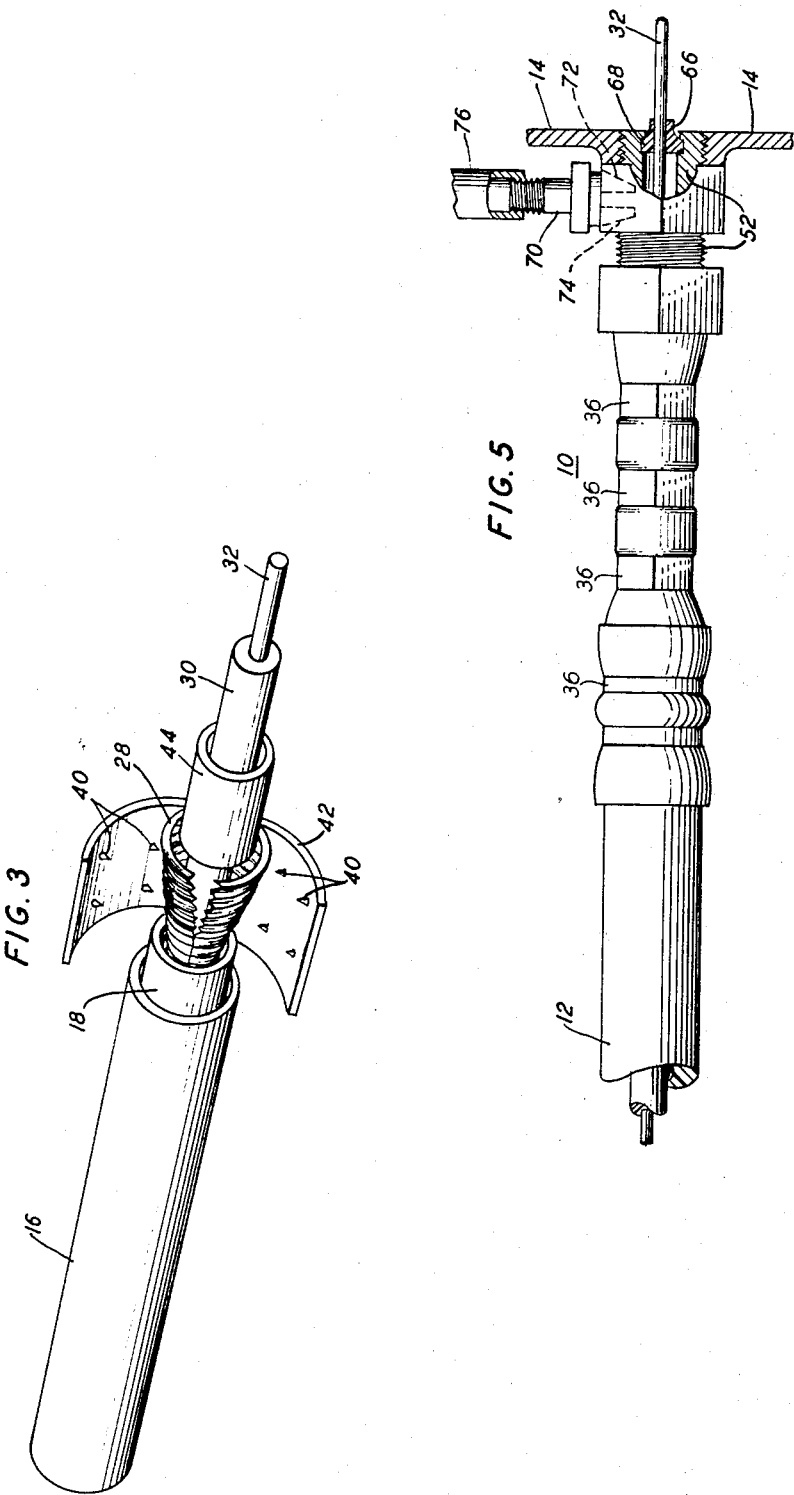

Oct. 29, 1968   W. C. KLEINFELDER   3,408,450
CABLE TERMINATION

Filed Aug. 4, 1966   3 Sheets-Sheet 3

United States Patent Office 3,408,450
Patented Oct. 29, 1968

3,408,450
CABLE TERMINATION
Walter C. Kleinfelder, Summit, N.J., assignor to Bell Telephone Laboratories Incorporated, Murray Hill, N.J., a corporation of New York
Filed Aug. 4, 1966, Ser. No. 570,208
8 Claims. (Cl. 174—21)

This invention relates to electrical connectors particularly for connecting a coaxial cable to a junction box or another coaxial cable.

Connecting cables to each other or to a junction box generally requires obtaining access to all interior conductors while maintaining the protection provided by each layer in the cable structure. The structure of low-cost coaxial distribution cable has made this particularly difficult. In such cables the outer conductor has an unsealed overlapped longitudinal seam. To prevent water from corroding the tube or entering the cable's interior and thereby deteriorating the cable's attenuation a plastic jacket surrounds the outer conductor. However, this plastic jacket is not moistureproof. Such moisture may enter the cable and condnese to do its harm. Thus, a vapor sheath composed of a vapor-tight aluminum foil sleeve sandwiched between a strengthening plastic on the outside and a heat-sealable plastic on the inside, protects the cable interior from entrance of ambient moisture.

Where the coaxial dielectric spacing between the outer and center cable conductors is composed of a cellular so-called expanded polyethylene this protection is even more necessary. The dielectric is readily permeated by ambient vapors. When the vapors condense they disturb the cable's electrical properties. Typically, they increase the cable's attenuation.

The function of the sheath is not limited to barring vapors. It also serves as a shield for surrounding the outer conductor electrically.

The properties of such cables are frequently supplemented to prevent the entrance of liquid moisture through the plastic cable jacket by subjecting the jacket interiors to continuous air pressures.

Coaxial connectors have not been successful in maintaining the usefulness of these cable features. For example, obtaining access to the aluminum sandwiched in the sheath has been difficult. Such electrical access can be obtained in some cases by barring the aluminum or piercing it inwardly. However, when the dielectric separating the coaxial conductors of the cable is collapsible it permits the connection to work loose. Yet collapsible dielectrics such as longitudinally-spaced discs or expanded plastics are often essential. They include large quantities of air which decrease their overall dielectric constant and thereby decrease the attenuation of the cable.

With loose connectors, keeping the airtight character of the cable or a junction box to which it connects so as to maintain their water-expelling air pressure has been an especially acute problem. When the connectors work loose they open air leaks. In general sealing such leaks involves injecting liquid resin into the cable to plug it. This is time-consuming and requires highly trained personnel.

An object of the present invention is to connect such cables to junction boxes or to other cables with simple devices that reliably contact each of the conductors as well as the sheath while maintaining the integrity and advantages of the cable's elements.

Another object of this invention is to establish firm connections with such cables while at the same time permitting air pressure to be maintained by the cable jacket.

Yet another object of the invention is to accomplish such connection with simple enough tools so that a relatively inexperienced craftsman may accomplish the connection in the field under adverse conditions.

Still another object is to achieve the above while acquiring a firm grip on all the cable's elements.

According to the invention these objects are obtained at a cable terminal that has been stripped back so that the inner conductor, the dielectric, the outer conductor and the sheath project through the outer sleeve in decreasing order, by sliding a cylindrical metal bushing between the dielectric and the outer conductor before surrounding the sheath and the outer conductor with a hard metal cylindrical clip having inwardly-directed tangs and then crimping a surrounding metal sleeve about the jacket and the clip so as to force the tangs through the aluminum of the sheath, and into the copper outer conductor. The metal sleeve then supports a rotatable nut member that is capable of screwing onto a tapped receptacle mounted on the housing to be connected such as the junction box. The metal sleeve then constitutes an extension of the outer conductor and sheath. According to a preferred embodiment of the invention, the end of the cable is fluid-sealed by applying a sealing compound about the cable jacket and plugging the space between the sleeve and the dielectric at the end of the copper outer conductor and clip with a washer-shaped sealing material, before crimping the metal sleeve. When this preferred embodiment is connected to a cable, the dielectric and the center conductor project through an opening in the receptacle mounted on the junction box to a suitable binding post.

By substituting for the junction box a twin-cable termination and a double-ended sleeve connecting the terminations, these connectors are suitable for joining cables to each other.

Figure 6:
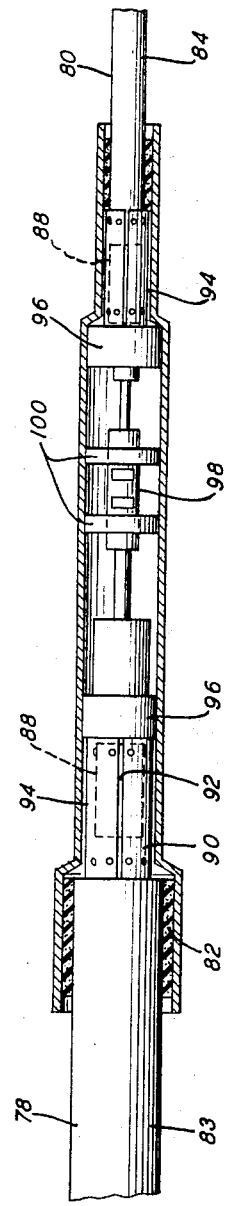

These and other features of the invention are pointed out in the claims. Other objects and advantages of the invention will be understood from the following detailed description when read in light of the accompanying drawings wherein:

FIG. 1 is a perspective view of a cable connection embodying features of the invention for connecting the cable to a junction box;
FIG. 2 is a section of FIG. 1;
FIG. 3 is an exploded view illustrating the assembly of the cable connection of FIG. 1;
FIG. 4 is a sectional view of the sheath in FIGS. 2 and 3;
FIG. 5 is an elevation partly in section of a connector also embodying features of the invention; and
FIG. 6 is a partly sectional, partly cut away elevation of two connectors terminating at the ends of two cables and joining each other.

In FIGS. 1, 2 and 3, connector 10 secured to a cable 12 connects the latter to a junction box 14 shown only in FIG. 2. A polyethylene outer jacket 16 on the cable 12 embraces an interior vapor sheath 18 whose construction details are illustrated in the cross-sectional view of FIG. 4 where the thicknesses are exaggerated for clarity. The sheath is a laminate. It has a central layer 20 of two mil thick aluminum sandwiched and laminated between a strength-giving layer 22 of one mil thick Mylar and an interior thermoplastic layer 24 of six mil polypropylene. An outer layer 25 of six mil polypropylene completes the laminate. The sheath 18 is rolled longitudinally overlapped, and its inner polypropylene layer is heat-sealed to the outer layer to form a longitudinal seam 26. The dimensions given here are of course only examples.

Underneath the sheath 18, a transversely-corrugated, transversely-rolled outer conductor 28 of strip copper forms a longitudinally-extending overlapped seam. An expanded-polyethylene dielectric 30 composed of cellular polyethylene foam trapping about 50 percent air by volume coaxially spaces a longitudinally-extending center conductor 32.

In the cable termination according to the invention, the conductors, the dielectric, the sheath and the jacket 16 are stripped so that each projects successively beyond the other as shown in FIG. 3. The connector 10 holds this cable by means of a sleeve 34 that is crimped over the outer jacket 16 with crimps 36 extending to the end of the outer conductor 28. A paste sealant 38 under the sleeve 34 protects the connection from entrance of water. The crimps 36 in the cable force inwardly-projecting tangs 40 on a longitudinally hinged cylindrical clip 42 that surrounds the outer conductor 28 and the sheath 18 into electrical engagement with the metals of the latter two.

Supporting the outer conductor 28 against the inwardly-crushing force of the crimps 36 is a cylindrical metal bushing 44 that extends longitudinally from the end of the sheath 18 to the end of clip 42. This bushing protects the structural integrity of the crushable expanded polyethylene 30 that spaces the inner and outer conductors. It permits the crimps 36 of the sleeve 34 to grasp the outer conductor 28 firmly.

The bushing 44 radially expands the open-seamed outer conductor 28 slightly. The bushing does not fit into the sealed sheath 18. However, it helps the sleeve 34 to hold the conductor 28 tightly. The conductor 28, in turn, stretched over the end of the bushing 44 holds the sheath tightly enough for tangs 40 to penetrate the aluminum of the sheath 18 without distorting the dielectric 30.

The sleeve 34 contacts the outer conductor 28 and the aluminum of the sheath 18 through the clip 42. A washer-shaped ring 46 of putty-like sealing compound between the sleeve and dielectric 34 prevents entry of gas into the cable from the box 14 if the latter is under pressure. A cylindrical insert 48 occupying the space between the dielectric 30 and the sleeve 34 at the sleeve's end, supports the latter.

A so-called compression fitting 50 secures a hexagonal-sided stud 52 over the end of the sleeve 34. The fitting 50 affixes the sleeve by compressing a ferrule 54 having tapered ends between the interior stepped surface of a nut 56 and the end of an outside threaded tube 58 axially emerging from the stud 52 and surrounding the sleeve 34. By turning the nut 56 tightly upon the tube 58, the tapered surfaces of the ferrule 54 are subjected to a radial force that squeezes the ferrule 54 onto the sleeve 34. The entire assembly is attached to the junction box 14 by screwing the stud 52 into the tapped opening 60 in the housing before tightening the nut 56. The center conductor 32 which projects into the box is secured by a suitable binding post 62 in the box.

A craftsman can apply the connector 10 to a cable 12 by first stripping the end of the cable material as shown in FIG. 3. He proceeds by slipping the bushing 44 under the outer conductor 28 and sheath 18. The clip 42 is then applied about the sheath 18 and the outer conductor 28 in line with the bushing 44. He then applies sealing compound 46 and sealant 38 before slipping the sleeve 34 with its insert 48 into position and crimping the area covering the jacket 16, the clip 40 and the sealing compound 46. The stud 52 is affixed in the opening 60. The craftsman continues by sliding the nut 56 and the ferrule 54 over the end of sleeve 34. It is now necessary to push the sleeve 34 into the opening 60 and secure center conductor 62 onto the binding post. The job is completed by securing the stud 52 and by tightening the nut 56 to the tube 58.

Obviously, various sizes of cable can be connected to the housing by suitably narrowing the sleeve 34. By using stepped sleeves, various sizes of cables can be accommodated with one size of stud 52 and related parts. Moreover, the invention is practicable not only with the expanded polyethylene dielectric but with other conductor-spacing dielectrics that fail to support the outer conductor with any degree of reliability against the crushing forces of the crimping action. For example, it is useful with so-called disc-insulated cables wherein the dielectric constitutes a number of longitudinally-spaced discs embracing the center conductor and being held within the outer conductor.

FIG. 5 illustrates how cables, such as disc-insulated cables, which are subjected to internal gas pressure for the purpose of excluding moisture and which also include a moisture barrier sheath can bypass the gas pressure around a box according to the invention. Here, the connector 10 on a cable 12 also grasps the cable parts as illustrated in FIGS. 1, 2 and 3. The connector also screws into a junction box 14 which need not itself be airtight. According to the invention, the plug 46 of FIG. 2 is omitted and a plastic grommet 66 embracing the center conductor 32 fits snugly into an annular recess 68 in the interior of the stud 52. A threaded bypass fitting 70 fits into a radial bore 72 in the bolt 52. Preferably the bore and fitting 70 are tapered to provide an airtight lock. A passage 74 through the fitting 70 communicates with a suitable tube 76 secured to the fitting 70 for bypassing the box 14 and connecting to a connector 14 at another face of the housing.

FIG. 6 illustrates the invention as embodied in a connector joining the ends of two cables 78 and 80. Here, a sleeve 82 corresponding to the sleeve 34 and having varying diameters to accommodate varying cable jacket sizes is crimped about the outer jacket 83 and 84 of the cables. Suitable sealants cover the cable ends around the jackets before the sleeve is crimped. The sleeve 82 is also crimped about a clip 88 corresponding to the clip 42, whose tangs penetrate and a contact a laminated sheath 90 corresponding to the sheath 18 as well as an outer conductor 92 corresponding to the outer conductor 28. A bushing 94 corresponding to the bushing 44 supports the outer conductor against the crimping action on the sleeve 82. The sleeve 82 is also crimped about the identical portions of the sleeve 80 whose parts, for convenience, are identified by the same reference characters as the cable 78. Sealing plugs 96 inside the sleeve 82 prevent gas flow through the splice where such flow is undesirable. A connector sleeve 98 surrounds the center conductors of the cables being joined by being pressed and crimped about the center conductors. Washers 100 center the connector tube 98 in the sleeve 82.

By virtue of the invention, the cable can be connected either to a cable or to a housing without regard to the character of either the cable or the housing which it connects. Specifically, the connector according to the invention can bypass an unsealed housing while retaining its own airtight integrity. Moreover, the cable is capable of retaining its electrical and vapor-shielding qualities while connecting the electrical shield to other electrical shields.

The structures of FIGS. 1 to 6 may be modified by elongating the bushing 44 or 94 to extend under the portion of the outer conductor 28 or 92 that lies beneath the sheath 18 or 90. This is done by first slitting the exposed portion of sheath 18 or 90 axially. In that case more force is required to penetrate the sheath and contact the outer conductor 28 when crimps 36 are formed.

While embodiments of the invention have been described in detail, it will be obvious to those skilled in the art that the invention may be embodied otherwise without departing from its spirit and scope.

What is claimed is:

1. A cable termination comprising an inner conductor, an outer conductor coaxially surrounding said inner conductor, radially crushable dielectric means spacing said conductors, vapor barrier means surrounding said outer conductor and including sheets of insulating and conductive material, rigid bushing means between said outer conductor and said dielectric means for supporting said outer conductor independent of said dielectric means, said bushing means extending at least up to said vapor barrier means, clip means of relatively hard metallic material surrounding said vapor barrier means and said outer conductor and having inwardly extending hard metal tangs, an outer insulating jacket surrounding said outer conductor, an outer sleeve surrounding said jacket and being crimped for forcing said tangs through said vapor barrier and against said outer conductor and to hold said outer jacket.

2. A termination as in claim 1 further comprising a hollow receptacle surrounding said crushable dielectric means and secured to the end of said sleeve, said receptacle having threads on the outside suitable for engagement with a tapped opening in the housing of an electrical distribution box.

3. A termination as in claim 2 wherein grommet means seal the access to the receptacle for pressurized air between said inner conductor and said receptacle.

4. A termination as in claim 2 wherein said receptacle forms a threaded radial opening, a fitting threadably secured in said opening and having an interior bore, said fitting having exterior threads for connection to an air pressure bypass tube.

5. A cable termination as in claim 1 wherein said outer conductor includes peripherally-extending corrugations.

6. A cable termination as in claim 1 wherein said vapor barrier means include a metallic sheath sandwiched between a tear-resistant plastic on one side and a heat-fusible plastic on the inside, said sheath having longitudinally arranged edges extending outwardly with the heat-fusible plastic portions adjacent each other to form a fin, said heat-fusible plastic having its longitudinal edges fused to each other.

7. A termination as in claim 1 wherein said sleeve extends beyond the end of said inner and outer conductors to embrace the jacket of a conductor or cable extending to said inner conductor for the purpose of forming a joint, and wherein said jacket embraces an outer conductor joined to said sleeve for the purpose of creating a contact with said first outer conductor and wherein means secure said inner conductors for electrical connection.

8. A termination as in claim 1 wherein said outer sleeve and said dielectric means extend longitudinally beyond said clip, and wherein putty-like sealing means fill the radial void between said sleeve and said insulating jacket.

References Cited
UNITED STATES PATENTS

| | | | |
|---|---|---|---|
| 2,538,225 | 1/1951 | Alford | 174—21 |
| 3,010,747 | 11/1961 | Bondon. | |
| 3,109,052 | 10/1963 | Dumire et al. | 174—75 X |
| 3,372,364 | 3/1968 | O'Keefe et al. | 339—177 |

LARAMIE E. ASKIN, *Primary Examiner.*